March 14, 1961     A. C. HAZARD     2,974,986
BUSHING
Filed Aug. 10, 1956
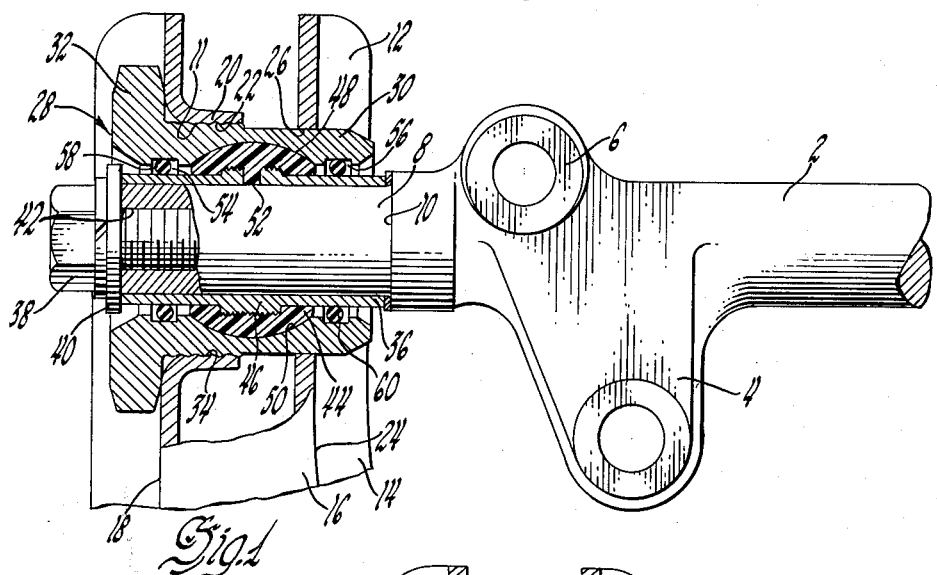
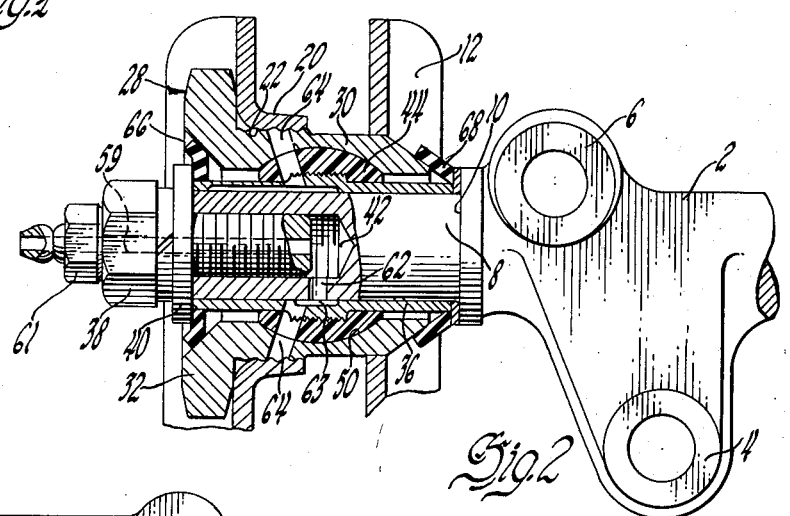
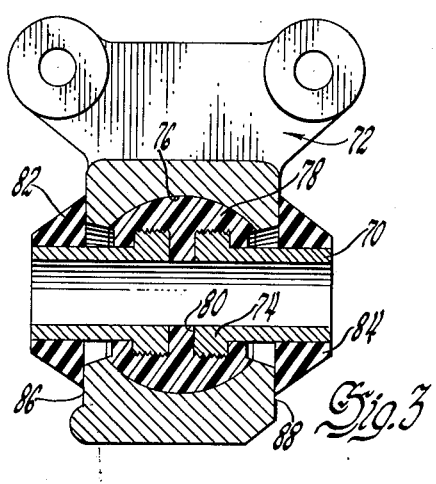
INVENTOR.
Albert C. Hazard
BY Paul Fitzpatrick
ATTORNEY.

United States Patent Office 2,974,986
Patented Mar. 14, 1961

2,974,986

BUSHING

Albert C. Hazard, Detroit, Mich., assignor to General Motors Corporation, Detroit, Mich., a corporation of Delaware Filed Aug. 10, 1956, Ser. No. 603,364

3 Claims. (Cl. 287—88)

This invention relates to bushing construction and more particularly, although not exclusively, to bushing structures for vehicle suspension.

Virtually all current passenger cars utilize independent front wheel suspension of the type in which each wheel is connected to a pair of vertically spaced transversely extending wishbone arms. Generally these arms are pivotally supported at their inner ends on the front frame cross member. In the typical case, the inner ends of the arms are provided with longitudinally spaced bushings which rotatably embrace journal portions at opposite ends of a forged pivot shaft. The shaft in turn is bolted or otherwise connected to the cross frame member. Quite recently rubber bushings have been widely adopted. While rubber bushings possess certain advantages with respect to noise isolation and ability to tolerate distortion and deflection misalignment, they also possess certain disadvantages such as rapid torsional wind-up during wheel deflection and relatively rapid deterioration.

An object of the present invention is to provide an improved bushing structure.

Another object is to provide a bushing structure which is particularly suited for pivotally connecting wheel suspension arms with a vehicle frame.

A further object is to provide a multi-part unitary bushing structure for use in conjunction with vehicle suspension arms and the like.

Still another object is to provide a suspension arm bushing structure capable of accommodating a limited degree of universal movement.

Still a further object is to provide a cylindrical bushing structure having cooperating semi-spherical bearing portions.

Yet another object is to provide a bushing structure of the type described which is threadably attachable to a suspension arm.

Yet a further object is to provide a bushing structure having an annular outer member, an annular inner member concentric with the outer member and providing a clearance therebetween, the said inner member having a semi-spherical non-metallic portion attached thereto and effecting bearing engagement with the inner wall of the outer member.

A still further object is to provide a bushing structure of the stated character in which the inner and outer cylindrical members are so formed and arranged as to permit placement of the non-metallic bearing portion by means of injection molding.

Yet another object is to provide a bushing structure of the type described including means for preventing entrance of foreign matter into the cooperating bearing surfaces.

Still a further object is to provide a structure of the type referred to including means for periodic lubrication.

These and other objects, advantages and features of the invention will become more fully apparent as reference is had to the accompanying drawings wherein:

Fig. 1 is an enlarged fragmentary view partly in section of a wishbone suspension arm and pivot shaft assembly incorporating the present invention;

Fig. 2 is a view similar to Fig. 1 illustrating a modified form of the invention; and Fig. 3 is an enlarged sectional view of another modification of the invention.

Referring now to the drawings and particularly Fig. 1, the reference character 2 designates generally one end of a wishbone suspension arm pivot shaft. It will be understood that pivot shaft 2 is symmetrical in form and that the opposite end thereof, not shown, is reversely similar to the end shown. Pivot shaft 2 is provided with apertured enlarged portions 4 and 6 which are adapted to receive bolts, not shown, for attaching the shaft at a suitable location on the vehicle frame cross member, not shown. At its outer end, shaft 2 is provided with a reduced journal portion 8 terminating at shoulder 10. Journal portion 8 extends into an opening 11 formed in the inward end of one leg 12 of a suspension wishbone arm 14. It will be understood that wishbone arm 14 is provided with another leg, not shown, which surrounds the opposite end of the pivot shaft previously referred to. As seen in Fig. 1, leg 12 of wishbone arm 14 is formed with a raised rib 16 in which is formed the opening previously referred to. In accordance with one feature of the invention, the outer side wall 18 of rib 16 is apertured and rolled inwardly to provide an annular lip 20 having internal threads 22 formed thereon, while the other wall 24 of rib 16 is pierced to form an aperture 26, the diameter of which is slightly less than the inside diameter of annular lip 20.

Disposed between opening 11 and journal portion 8 is a cylindrical bushing assembly 28 which provides low friction pivotal engagement between wishbone 14 and pivot shaft 2. As seen in Fig. 1, bushing structure 28 comprises an outer cylindrical member 30 having a radially directed hexagonal flange 32 formed at one end thereof. Axially adjacent flange 32, the periphery of member 30 is formed with external threads 34 adapted for threaded engagement with the internal threads 22 formed on annular lip 20 of wishbone 14. Disposed concentrically relative to member 30 and surrounding the journal portion 8 is an inner cylindrical member 36. Member 36 is slightly greater in length than journal portion 8 and is retained thereon against rotary movement by means of a machine bolt 38 and washer 40. Bolt 38 threadably engages a threaded bore 42 formed in portion 8 and is effective through washer 40 to exert endwise pressure on member 36 causing the latter to frictionally grip the shoulder 10. Disposed in the annular cavity between the outer wall of inner cylindrical member 36 and the inner wall of outer cylindrical member 30 is a semi-spherical non-metallic bearing element 44. Element 44 is preferably a phenolic plastic material and is mechanically locked to member 36 by means of an annular serrated rib 46 formed centrally on the former. The outer semispherical surface 48 of phenolic member 44 effects bearing contact with a cooperating semi-spherical lapped surface 50 formed on the inner wall of outer cylindrical member 30.

In accordance with another feature of the invention, phenolic bearing element 44 is molded in situ while outer cylindrical member 30 and inner cylindrical member 36 are maintained in proper alignment in a suitable fixture. In order to facilitate injection of phenolic material into the space between members 30 and 36, the central ribbed portion 46 of the latter is provided with a radially extending drilled passage 52 through which the material may be injected while both cylindrical members are properly positioned in the assembly fixture.

In order to prevent entrance of foreign matter between the cooperating bearing surfaces 48 and 50, the inner wall of outer cylindrical member 30 is provided with a pair of axially spaced circumferential grooves 54 and 56 which are adapted to receive a pair of O-ring seals 58 and 60.

When constructed and arranged in the manner described, bushing structure 28 effects a low friction pivotal connection possessing superior wearing qualities and complete freedom from torsional wind-up. In addition, because of the spherical bearing surfaces, greatly improved control of thrust pressure in the direction of resultant braking loads is obtained. In this connection, tests have shown that a bushing according to the present invention is capable of withstanding enormous axial loading without failure. A further important advantage of the invention resides in its ability to tolerate possible variation in axial alignment between the opposite journal portions on pivot shaft 2. That is, the spherical bearing portions automatically compensate for any initial distortion of shaft 2 or for deflection misalignment of either the legs of the wishbone 14 or the opposite ends of pivot shaft 2.

Fig. 2 illustrates a modified form of the invention which is so constructed and arranged as to permit periodic service lubrication. As seen in Fig. 2, the bolt 38 is provided with a central axial passage 59 which provides communication between a conventional grease fitting 61 and the bottom of threaded bore 42. A drilled radial passage 62 provides communication between bore 42 and an annular relieved portion 63 formed on the inner wall of inner cylindrical member 36. A plurality of additional passages 64 are drilled through the outer cylindrical member 30, phenolic insert 44 and inner cylindrical wall 36 after assembly to effect communication with the annular relieved portion 63. When bushing 28 is installed, the annular lip 20 of the wishbone arm closes the outer ends of passages 64 so as to provide closed lubricant retaining wells. A pair of annular grease seals 66 and 68 are disposed at opposite ends of bushing structure 28 to prevent entrance of foreign matter into the cooperating bearing surfaces.

In Fig. 3 there is shown a further modification of the invention. In the modification shown, a tubular member 70 extends completely through a forged socket member 72. Centrally thereof member 70 is formed with a circumferential serrated rib 74. Member 72 is provided with a semi-spherical cavity 76. Phenolic bearing element 78 is injection molded into the space between cavity 76 and the outer wall of tubular member 70 through drilled radial passages 80 in the wall of member 70 and is locked to the latter by rib 74. A pair of frusto-conical seal members 82 and 84 are disposed over the opposite ends of tubular member 70 and abut the side walls 86 and 88 of socket member 72.

While several embodiments of the invention have been shown and described, it will be apparent that other changes and modifications may be made therein. It is, therefore, to be understood that it is not intended to limit the invention to the embodiments shown, but only by the scope of the claims which follow.

I claim:

1. An anti-friction bushing comprising inner and outer tubular members arranged in concentric relation, the outer wall of said outer member carrying threads whereby such member may be secured to a support, the inner wall of said member having an annular semi-spherical groove therein, a circumferential rib formed integrally on the outer wall of said inner tubular member, a body of phenolic resin surrounding said inner tubular member and securely engaging said rib, said body providing bearing engagement with said semi-spherical groove, and a pair of flexible seals engaging said inner and outer members at opposite sides of said body of phenolic resin to form a lubricant cavity.

2. The structure set forth in claim 1 wherein said flexible seals comprise a pair of O-rings seated in spaced circumferential grooves in said outer tubular member.

3. The structure set forth in claim 1 wherein said circumferential rib is formed with a serrated periphery providing optimum mechanical engagement with said phenolic resin liner.

References Cited in the file of this patent

UNITED STATES PATENTS

| | | |
|---|---|---|
| 2,063,704 | Slack | Dec. 8, 1936 |
| 2,069,781 | Skillman et al. | Feb. 9, 1937 |
| 2,096,116 | Leighton | Oct. 19, 1937 |
| 2,171,157 | Mathews | Aug. 29, 1939 |
| 2,305,880 | Leighton | Dec. 22, 1942 |
| 2,339,533 | Wahlberg et al. | Jan. 18, 1944 |
| 2,757,015 | Latzen | July 31, 1956 |
| 2,827,303 | Herbenar | Mar. 18, 1958 |
| 2,852,287 | Baker | Sept. 16, 1958 |